(12) United States Patent
Tanioka

(10) Patent No.: US 8,054,521 B2
(45) Date of Patent: Nov. 8, 2011

(54) METHOD FOR ADJUSTING GALVANO SCANNER SYSTEM

(75) Inventor: Nozomu Tanioka, Azumino (JP)

(73) Assignee: Harmonic Drive Systems, Inc., Tokyo (JP)

( * ) Notice: Subject to any disclaimer, the term of this patent is extended or adjusted under 35 U.S.C. 154(b) by 446 days.

(21) Appl. No.: 12/421,021

(22) Filed: Apr. 9, 2009

(65) Prior Publication Data

US 2009/0284815 A1 Nov. 19, 2009

(30) Foreign Application Priority Data

May 14, 2008 (JP) ................................. 2008-126785

(51) Int. Cl.
*G02B 26/08* (2006.01)
(52) U.S. Cl. ................... 359/202.1; 359/199.1; 359/900
(58) Field of Classification Search .... 359/198.1–199.4, 359/201.1–202.1, 900; 346/107.3–107.5; 250/234–236
See application file for complete search history.

(56) References Cited

U.S. PATENT DOCUMENTS 7,242,506 B2 * 7/2007 Kandori et al. ............ 359/196.1

FOREIGN PATENT DOCUMENTS

JP 2003-220485 A 8/2003

* cited by examiner

*Primary Examiner* — James Phan
(74) *Attorney, Agent, or Firm* — Buchanan Ingersoll & Rooney P.C.

(57) ABSTRACT

In a galvano scanner system (1), a light position detection unit (30) is mounted so as to match the scanning center of the workpiece surface (7), the light position detection unit being provided with a two-dimensional light position sensor (32) disposed in the center and four one-dimensional light position sensors (33(1)) to (33(4)) concyclically disposed at equal angles about the center of the two-dimensional light position sensor. An origin position command is given to galvano scanners (3, 4), laser light is irradiated at low output, and the offset adjustment value is calculated based on the detection output of the two-dimensional light position sensor (32). Next, the galvano scanners (3, 4) are pivoted left, right, up, and down; the perpendicularity in relation to the workpiece surface (7) is determined and the distance from the workpiece surface (7) is calculated based on the detection output of each one-dimensional light position sensor (33); and the scale adjustment value is calculated on the basis thereof. Adjustment can be carried out with good accuracy in a simple manner in comparison with the case in which such an adjustment is made in alignment with a scale on a workpiece surface while visually observing visible laser light.

7 Claims, 4 Drawing Sheets

METHOD FOR ADJUSTING GALVANO SCANNER SYSTEM

BACKGROUND OF THE INVENTION

1. Field of the Invention

The present invention relates to a method for adjusting the offset and scale of a galvano scanner system.

2. Description of the Related Art

A galvano scanner system is used for scanning a laser light in various laser machining devices in accordance with a fixed drive pattern. In the case that the system is used as a laser-marking device, for example, a galvano scanner system provided with an X-axis galvano scanner and a Y-axis galvano scanner is mounted in a laser machining device and laser light emitted from a laser light source is two-dimensionally scanned along a work surface by the scanners in accordance with a fixed drive pattern to provide predetermined markings on the work surface. A galvano scanner system is also used as a laser drawing device for projecting laser light onto a wall surface or the like.

In the final assembly step in a galvano scanner system, the scale (amount of movement of laser light on the workpiece surface in relation to an input command) and offset (distance by which the laser light spot formed on the workpiece surface deviates from the center position of scanning on the workpiece surface when the galvano scanner is positioned at the original position) of laser light irradiated onto the workpiece surface (scan surface) are adjusted. The adjustment work is generally carried out by irradiating visible laser light onto a workpiece surface and causing the light to conform to a scale on the workpiece surface while visually observing the laser spot on the workpiece surface. In the case of a galvano scanner system used in a laser drawing device that projects laser light onto a wall surface or the like, the scale is affected by the distance to the wall surface and the perpendicularity in relation to the wall surface. Therefore, the distance and the perpendicularity must also be adjusted.

Japanese Laid-open Patent Application 2003-220485 discloses a laser marking device provided with a function for using guiding laser light, which is visible laser light, to project, onto a workpiece via a galvano half mirror, a guide image that corresponds to a pattern to be printed. With the laser marking device, an irradiated point of guiding laser light is scanned onto a workpiece by rotating a galvano mirror on the basis of the same coordinate data in the same manner as during a print operation, and a guide image of the print pattern is projected onto the workpiece surface. The error between the projected position of the guide image and the desired position on the workpiece can be confirmed and the print position can be adjusted prior to the start of printing.

A method for adjusting the offset of a galvano scanner system and a method for adjusting the scale in a simple manner have not been proposed in the art. Also, a method has not been proposed in which the distance to the workpiece surface can be measured without affecting the scale adjustment and in which it can be determined if the light is sufficiently perpendicular in relation to the workpiece surface.

In view of the above, an object of the present invention is to provide a method for adjusting a galvano scanner system in which the offset can be adjusted in a simple manner.

Another object of the present invention is to provide a method for adjusting a galvano scanner system in which the scale can be adjusted with good accuracy in a simple manner on the basis of the measured distance to the workpiece surface and the determination of the perpendicularity in relation to the workpiece surface.

SUMMARY OF THE INVENTION

In order to solve the problems described above, the method for adjusting a galvano scanner system according to the present invention comprises:

arranging a two-dimensional position sensor on a surface to be scanned by a galvano scanner, in a scanning center position that corresponds to an origin position of the galvano scanner;

inputting to the galvano scanner an origin position command for positioning the galvano scanner in the origin position, and positioning the galvano scanner in the origin position on the basis of sensor output from a scanner position sensor mounted on the galvano scanner;

detecting with the aid of the two-dimensional position sensor a light spot of laser light produced by the galvano scanner positioned in the origin position;

monitoring a first difference between the output of the two-dimensional sensor and the origin position output of the two-dimensional sensor obtained for the case in which the center of the light spot is positioned in the center of the detection surface of the two-dimensional position sensor;

driving the galvano scanner so that the first difference is equal to or less than a specific preset value; and using as an offset adjustment value a second difference, determined in relation to the origin position command, of the position command inputted to the galvano scanner when the [first] difference has reached the specific value or less.

The method for adjusting a galvano scanner system according to the present invention comprises:

arranging at least two one-dimensional position sensors, the sensors being capable of detecting the center position of a light spot, in different positions set at a predetermined distance from the position of the scanning center on the scanning surface;

driving the galvano scanner to irradiate each of the one-dimensional position sensors with a light spot and to detect the deflection angles of the galvano scanner from the origin position when the output values of the one-dimensional sensors are within a range set in advance;

comparing the deflection angles with an allowable preset angle range and determining whether laser light irradiated onto the scanning surface from the galvano scanner in the origin position is sufficiently perpendicular in relation to the scanning surface;

adjusting the mounting position of the two-dimensional position sensor and the one-dimensional position sensors on the scanning surface in the case that the deflection angles A, B are outside the allowable angle range; and recalculating the offset adjustment value to determine whether the perpendicularity is sufficient.

The method for adjusting a galvano scanner system according to the present invention comprises:

calculating the distance V from the position of the scanning center to the center of at least one of the one-dimensional position sensors;

calculating the distance Z from the galvano scanner to the position of the scanning center on the basis of the angle of deflection of the galvano scanner from the origin position in the one-dimensional position sensors; and calculating the scale adjustment value on the basis of the distance Z, the deflection angles A, B, and the position command inputted to the galvano scanner when the deflection angles A, B are obtained.

Here, it is preferable to calculate the scale adjustment value; then sequentially performing an offset adjustment using the offset adjustment value, perpendicularity determination, calculation of the distance Z, and scale adjustment using the scale adjustment value; and determining (confirming) whether the adjustment is suitable.

Also, it is preferable to concyclically arrange the one-dimensional position sensors at equal angle intervals about the center of the two-dimensional position sensors; and to allow the concyclic position of the light spot in the radial direction to be detected by each of the one-dimensional position sensors.

With the present invention, a two-dimensional position sensor can be arranged in the position of the scanning center on a scanning surface (surface, wall surface, or the like of a workpiece), the center position of a light spot formed on the scanning surface can be detected, and the offset adjustment value can be calculated with good accuracy in a simple manner on the basis of the output of the two-dimensional position sensor.

Also, with the present invention, one-dimensional position sensors are arranged in a plurality of positions different from that of the two-dimensional position sensor on the scanning surface, the deflection angles of the galvano scanner are observed based on the output of the one-dimensional sensors, and the perpendicularity of the laser light is determined. The distance from the galvano scanner to the scanning surface is measured using the deflection angles. Therefore, the perpendicularity determination and the distance measurement can be carried out with good accuracy in a simple manner.

Furthermore, with the present invention, after the perpendicularity has been determined, the scale adjustment value is calculated based on the measured distance, the deflection angles, and the like. Therefore, the scale adjustment value can be obtained with good accuracy in a simple manner.

DESCRIPTION OF THE PREFERRED EMBODIMENTS

The method for adjusting a galvano scanner system to which the present invention has been applied will now be described with reference to the drawings.
(Configuration of the Galvano Scanner System)

Figure 1:
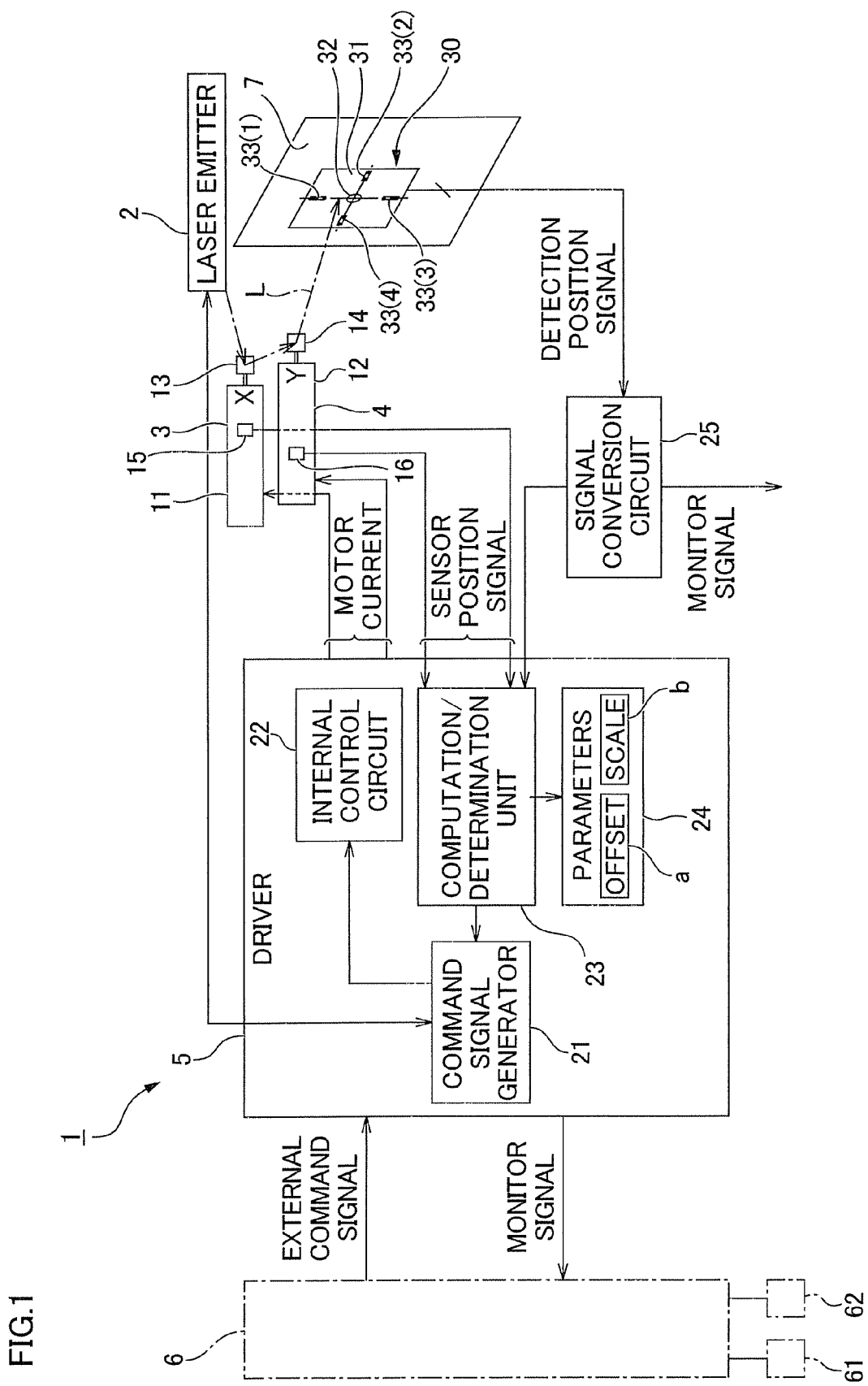
FIG. 1 is a functional block diagram depicting a galvano scanner system to which the present invention has been applied.

FIG. 1 is a functional block diagram depicting an example of a galvano scanner system in which the method of the present invention can been adopted. A galvano scanner system 1 has a laser emitter 2, an X-axis galvano scanner 3 and a Y-axis galvano scanner 4 for deflecting in a biaxial direction laser light emitted from the laser emitter, a scanner driver 5 for driving the scanners 3, 4, and a command generator 6 constituted by an analog controller, a personal computer, and the like for controlling the scanner driver 5. An operation input unit 61 and a display device 62 for monitoring are connected to the command generator 6.

The X- and Y-axis galvano scanners 3, 4 are provided with, e.g., finite-rotation motors 11, 12, and X- and Y-axis scanning mirrors 13, 14 mounted on the rotating shaft of the motors. Scanner position sensors 15, 16 for detecting the rotation angle position of the rotating shafts of the motors are mounted on the X- and Y-axis galvano scanners 3, 4.

A command generator program designed for the personal computer is installed in the command generator 6, whereby a digital position command of the X- and Y-axis galvano scanners 3, 4 is generated. The digital position command is presented to an analog controller and D/A converted to a command voltage, which is an analog position command, and is then presented to the scanner driver 5 as an external command signal.

The scanner driver 5 is provided with a command signal generator 21, an internal control circuit 22, a computation/determination unit 23, and an internal memory 24 in which an offset adjustment parameter "a," a scale adjustment parameter "b," and various other parameters are stored. The command signal generator 21 receives the external command signal from the command generator 6, generates a command signal on the basis of the external command signal, and presents the generated signal to the internal control circuit 22 and the laser emitter 2. The internal control circuit 22 generates a scanner drive signal (motor current) on the basis of the command signal, presents the generated signal to the X- and Y-axis galvano scanners 3, 4, and drives the X- and Y-axis galvano scanners 3, 4 to the specified angle position.

The actual angle positions of the X- and Y-axis galvano scanners 3, 4 are detected by the scanner position sensors 15, 16, and the detection output (sensor position signals) is provided as feedback to the command signal generator 21 via the computation/determination unit 23 of the scanner driver 5. The galvano scanners 3, 4 can be driven by manual operation from the operation input unit 61 of the command generator 6 via the scanner driver 5.

The galvano scanner system 1 is used as, e.g., a laser marking device. Laser light L for marking emitted from the laser emitter 2 is irradiated onto the workpiece surface 7 via an X-axis scanning mirror 13 of the X-axis galvano scanner 3 and via a Y-axis scanning mirror 14 of the Y-axis galvano scanner 4. A light spot of laser light L, is scanned in a biaxial direction on the workpiece surface 7, and a marking having a predetermined pattern is made on the workpiece surface 7.

In this case, in addition to the configuration described above, the galvano scanner system 1 is provided with a light position detection unit 30 disposed on the workpiece surface 7. The light position detection unit 30 is mounted on the workpiece surface 7 and used when adjusting the offset and scale of the galvano scanner system 1. The light position detection unit 30 is provided with a rectangular substrate 31, a single two-dimensional position sensor 32 mounted on the substrate 31, and a plurality of, e.g., four, one-dimensional light position sensors 33(1) to 33(4). The light position detection unit 30 is disposed in the same plane as the workpiece surface 7 and detects the position of the low-output laser light scanned by the galvano scanner system 1 on the workpiece surface 7.

The detection position signal of the two-dimensional light position sensor 32 of the light position detection unit 30, and the detection position signal of the four one-dimensional light position sensors 33(1) to 33(4) are each inputted to the computation/determination unit 23 via a signal conversion circuit 25. With the computation/determination unit 23, a comparison is made between the detected position of the light spot of laser light that is inputted from the light position detection unit 30 and the sensor position signal of the scanner position sensors 15, 16 mounted on the galvano scanners 3, 4, and it is determined whether the distance of the error is equal to or less than a specific preset value. The parameters held in the internal memory 24 are rewritten by the parameters for offset and scale adjustment calculated on the basis of commands from the command generator 6.

Figure 2:
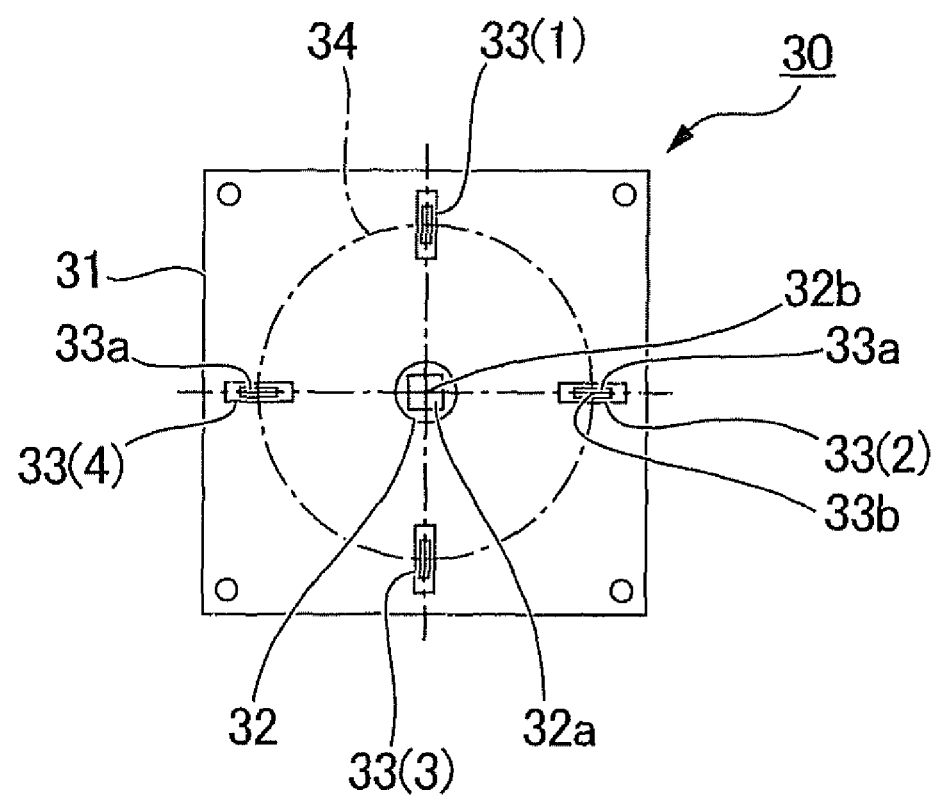
FIG. 2 is a schematic plan view depicting the light position detection unit of the galvano scanner system of FIG. 1.

FIG. 2 is a schematic plan view depicting the light position detection unit 30. The two-dimensional light position sensor 32 is arranged so that the center 32b of the detection surface 32a matches the center of the rectangular substrate 31. The two-dimensional light position sensor 32 is a semiconductor sensor for detecting the center position of the X- and Y-axis directions of the light spot irradiated onto the detection surface 32a. The four one-dimensional light position sensors 33(1) to 33(4) are arranged at intervals of 90° angles on a same circle 34 having the center 32b as the center. The detection surfaces 33a of the one-dimensional light position sensors 33(1) to 33(4) is arranged so as to concyclically extend in the radial direction, whereby the positions of the light spot irradiated onto the detection surfaces 33a are detected in the radial direction (positions in a one-dimensional direction). Each of the one-dimensional light position sensors 33(1) to 33(4) is arranged so that the center positions of the detection surfaces 33a of the one-dimensional light position sensors 33 are concyclically positioned.

(Offset and Scale Adjustment Procedure)

Figure 3:
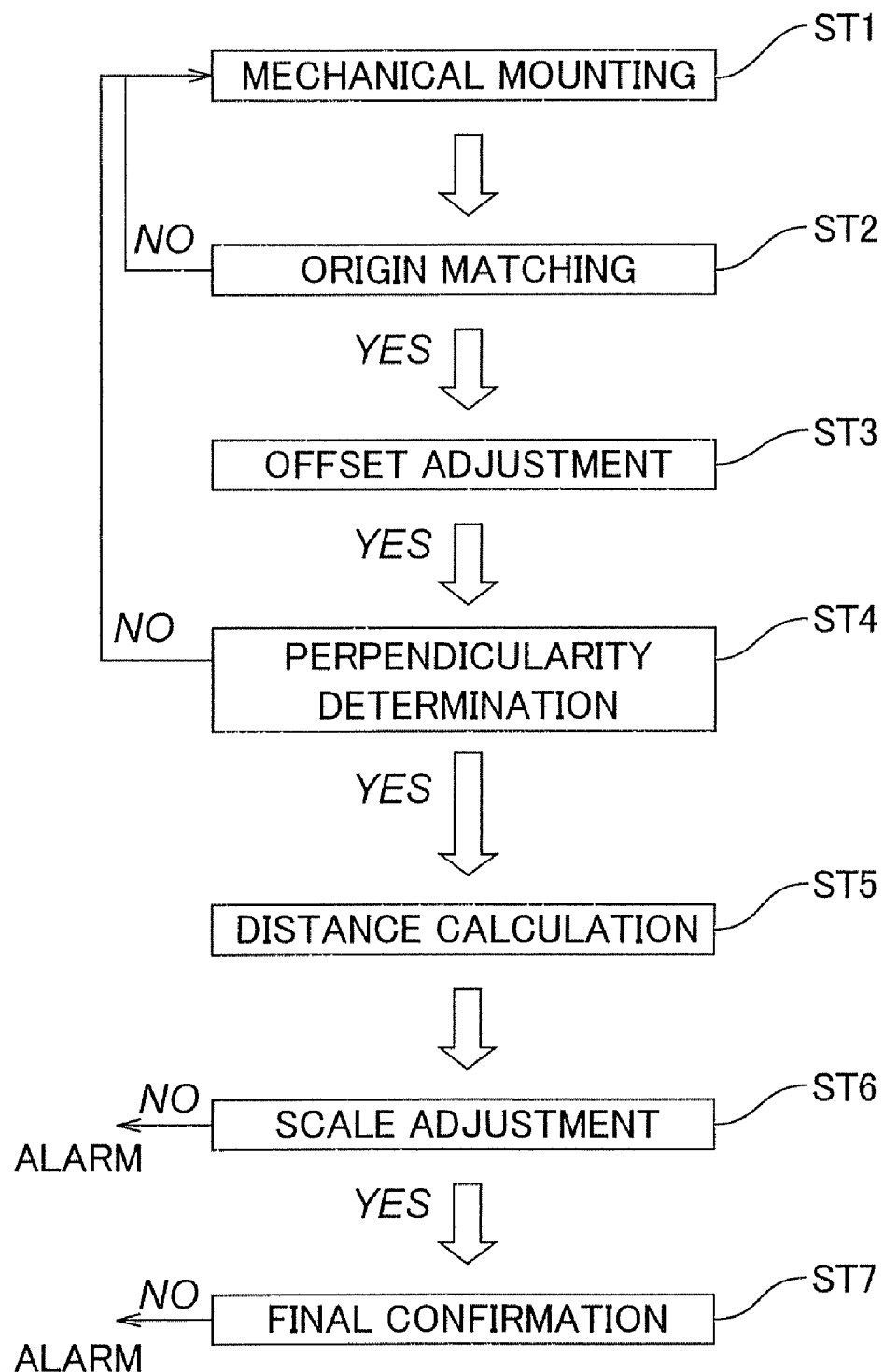
FIG. 3 is a schematic flowchart showing the work procedure for offset adjustment and scale adjustment of the galvano scanner system of FIG. 1.

FIG. 3 is a schematic flowchart showing the offset and scale adjustment procedure of the galvano scanner system 1. In these adjustments, first, the light position detection unit 30 is mounted on the workpiece surface (wall surface) 7. When the mounting is carried out, the center (the center 32b of the detection surface 32a of the two-dimensional light position sensor 32) of the light position detection unit 30 is roughly positioned so as to match the center (scanning center) of the workpiece surface 7 (step ST1).

Next, the galvano scanner system 1 is set to an adjustment mode, and an origin position command for positioning the X- and Y-axis galvano scanners 3, 4 in the origin position is inputted to the X- and Y-axis galvano scanners via the scanner driver 5 by manual operation. In the adjustment mode, low-output laser light is emitted from the laser emitter 2 and irradiated onto the light position detection unit 30 via the galvano scanners 3, 4. The position detection output of the two-dimensional light position sensor 32 is presented to the computation/determination unit 23 via the signal conversion circuit 25. The sensor position signal is received in a similar manner from the scanner position sensors 15, 16 of the galvano scanners 3, 4.

In the computation/determination unit 23, the difference between the origin position output and the position detection output of the light spot detected by the two-dimensional light position sensor 32 is calculated when the sensor position signal provides an origin position output that indicates placement of the galvano scanners 3, 4 in the origin position. The difference thus calculated is outputted as a monitor signal and is displayed on a monitor screen of the display device 62 connected to the command generator 6. The computation/determination unit 23 determines whether the difference thus calculated is equal to or less than a specific preset value, makes an acceptance determination indicating that a match has been made with the origin in the case that the value is equal to or less than a specific value, and makes a rejection determination when such is not the case. The determination result is displayed on the monitor screen (step ST2). In the case that a rejection determination has been made, the mounting position of the light position detection unit 30 is adjusted and the origin positioning is performed again.

After a match has been made with the origin, a command is manually inputted to the galvano scanners 3, 4 so that the center of the light spot is positioned at the center 32b of the detection surface 32a of the two-dimensional light position sensor 32. The computation/determination unit 23 monitors whether the position detection output of the two-dimensional light position sensor 32 has reached a value that is within a predetermined error range with respect to a specific preset output value. When the position detection output comes within a predetermined error range, a value that corresponds to a command input value is written at that time into the internal memory 24 as an offset adjustment value "a." Alternatively, the offset adjustment value "a" stored in the internal memory 24 is modified (step ST3).

An acceptance determination of the perpendicularity in relation to the workpiece surface 7 is then carried out (step ST4). For example, the X-axis galvano scanner 3 is pivoted left and right, and laser light is irradiated onto the detection surfaces 33a of the left and right one-dimensional light position sensors 33(2) and 33(4). The computation/determination unit 23 calculates the left and right deflection angles A, B about the center of the origin position of the galvano scanner 3 when the position detection output from the one-dimensional light position sensors 33(2) and 33(4) has reached a value that is within a predetermined output range. It is determined whether the deflection angles A, B thus calculated are values within an allowable preset angle range, an acceptance determination is made indicating that perpendicularity of a predetermined accuracy has been obtained in the case that the value is within an allowable angle range, and the result is outputted to the monitor screen. When such is not the case, a rejection determination is outputted to the monitor screen. A perpendicularity determination is made in a similar manner for the Y-axis direction.

Figure 4:
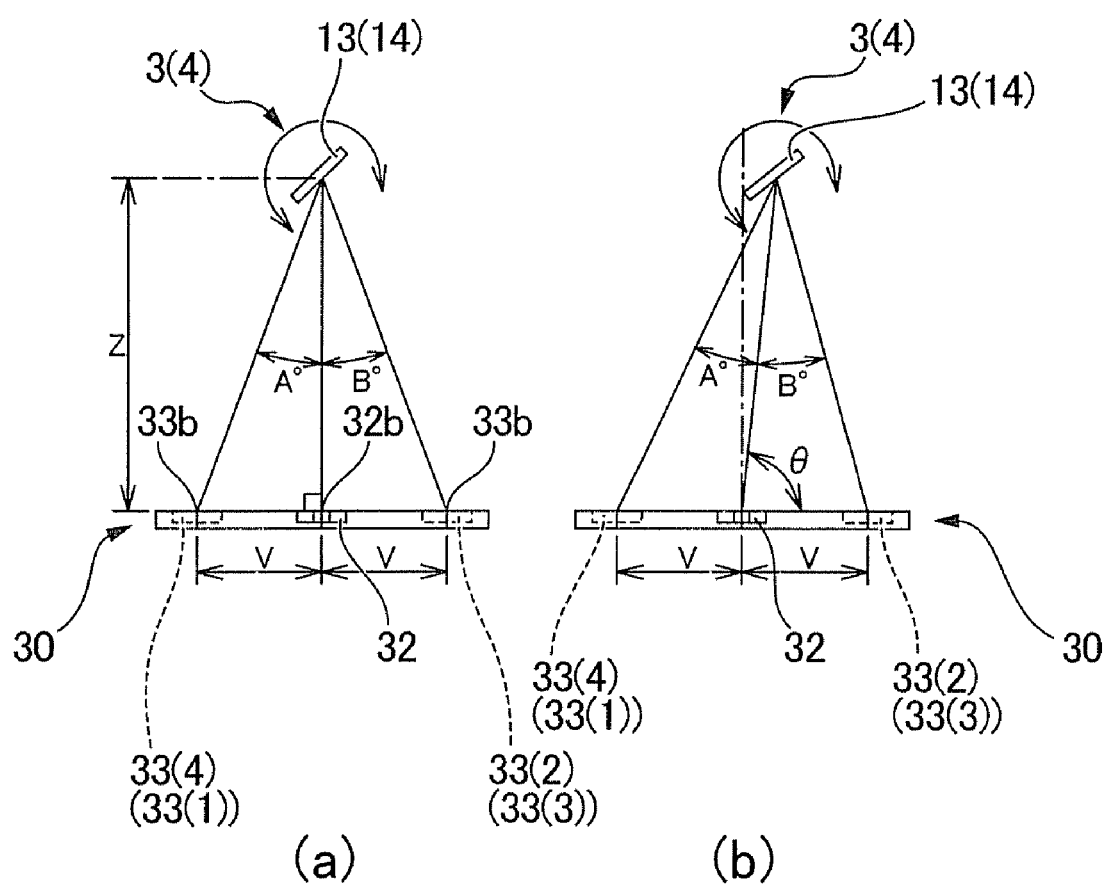
FIG. 4 is a descriptive diagram for determining the perpendicularity and calculating the distance from the workpiece surface.

Since the deflection angles are reduced when laser light L irradiated onto the center of the workpiece surface 7 is not perpendicular, it can be determined based on the deflection angles whether or not perpendicularity with a predetermined accuracy has been obtained, as shown in FIGS. 4(a) and 4(b). The perpendicularity on the horizontal plane can be determined by pivoting the X-axis galvano scanner 3 to the left and right, and the perpendicularity on the vertical plane can be determined by pivoting the Y-axis galvano scanner 4 up and down.

In the case that the perpendicularity determination produces an unacceptable result for both the X- and Y-axes, a slight adjustment or the like of the mounting position of the light position detection unit 30 is made, origin matching is carried out, the offset is adjusted, and the perpendicularity determination is performed again.

After the perpendicularity determination produces an acceptable result, the distance to the workpiece surface 7 is calculated (step ST5 of FIG. 3). The distance V from the center 32b of the detection surface 32a of the two-dimensional light position sensor 32 to the center 33b of the detection surface 33a of each one-dimensional light position sensor 33 is known, as shown in FIG. 4(a). The deflection angles A, B of the galvano scanners 3, 4 are also calculated in a state in which laser light is irradiated onto the center 33b of each of the one-dimensional light position sensors 33. Therefore, the distance Z to the workpiece surface 7 can be obtained using the following formula.

The scale adjustment value "b" can be calculated thereafter from the distance Z, as well as from the command input signals to the galvano scanners 3, 4 and the deflection angles A, B, on the basis of the position detection output of the one-dimensional light position sensors 33(1) to 33(4). The scale adjustment value "b" thus calculated is written to the internal memory 24. Alternatively, the scale adjustment value "b" stored in the internal memory 24 is modified (step ST6). At this point, an alarm is displayed on the monitor screen or the like in the case that the scale adjustment value "b" thus calculated is not within the allowable range set in advance. In such a case, adjustment must be carried out again beginning from origin matching.

After the scale adjustment value "b" has been calculated, a final confirmation operation is carried out (step ST7). In other words, calculation of the offset adjustment value, determination of the perpendicularity, calculation of the distance, and calculation of the scale adjustment value are repeated again. Normality is then confirmed and the operation is ended.

With the galvano scanner system 1 as described above, the offset and scale adjustment can be carried out in a simple manner using a light position detection unit 30. Also, the scale adjustment value can be calculated with good accuracy because the determination of perpendicularity in relation to the workpiece surface 7 and the calculation of the distance Z to the workpiece surface 7 are carried out prior to scale adjustment.

In addition to offset and scale adjustment, the light position detection unit 30 can also be used in the following manner. Specifically, input for drawing a perfect circle is provided as the input drive signal to the galvano scanner system 1. The detection outputs of concyclically arranged one-dimensional light position sensors 33(1) to 33(4) of the light position detection unit 30 are monitored to cause the laser light used for scanning to draw a perfect circle thereby. Based on the detection outputs, it is possible to calculate the amount of distortion of a dynamic optical system, to evaluate the ability of the galvano scanner to follow each axis, and to perform other operations.

What is claimed is:

1. A method for adjusting a galvano scanner system, comprising:
    arranging a two-dimensional position sensor on a surface to be scanned by a galvano scanner, in a scanning center position that corresponds to an origin position of the galvano scanner;
    inputting to the galvano scanner an origin position command for positioning the galvano scanner in the origin position, and positioning the galvano scanner in the origin position on the basis of sensor output from a scanner position sensor mounted on the galvano scanner;
    detecting with the aid of the two-dimensional position sensor a light spot of laser light produced by the galvano scanner positioned in the origin position;
    monitoring a first difference between the output of the two-dimensional sensor and the origin position output of the two-dimensional sensor obtained for the case in which the center of the light spot is positioned in the center of the detection surface of the two-dimensional position sensor;
    driving the galvano scanner so that the first difference is equal to or less than a specific preset value; and
    using as an offset adjustment value a second difference, determined in relation to the origin position command, of the position command inputted to the galvano scanner when the first difference has reached the specific value or less.

2. The method for adjusting a galvano scanner system according to claim 1, comprising:
    arranging at least two one-dimensional position sensors, the sensors being capable of detecting the center position of a light spot, in different positions set at a predetermined distance from the position of the scanning center on the scanning surface;
    driving the galvano scanner to irradiate each of the one-dimensional position sensors with a light spot and to detect the deflection angles of the galvano scanner from the origin position when the output values of the one-dimensional sensors are within a range set in advance;
    comparing the deflection angles with an allowable preset angle range and determining whether laser light irradiated onto the scanning surface from the galvano scanner in the origin position is sufficiently perpendicular in relation to the scanning surface;
    adjusting the mounting position of the two-dimensional position sensor and the one-dimensional position sensors on the scanning surface in the case that the deflection angles are outside the allowable angle range; and
    recalculating the offset adjustment value to determine whether the perpendicularity is sufficient.

3. The method for adjusting a galvano scanner system according to claim 2, comprising:
    calculating the distance V from the position of the scanning center to the center of at least one of the one-dimensional position sensors;
    calculating the distance Z from the galvano scanner to the position of the scanning center on the basis of the angle of deflection of the galvano scanner from the origin position in the one-dimensional position sensors; and
    calculating the scale adjustment value on the basis of the distance Z, the deflection angles, and the position command inputted to the galvano scanner when the deflection angles are obtained.

4. The method for adjusting a galvano scanner system according to claim 3, comprising:
    calculating the scale adjustment value;
    then sequentially performing an offset adjustment using the offset adjustment value, perpendicularity determination, calculation of the distance Z, and scale adjustment using the scale adjustment value; and
    determining whether the adjustment is suitable.

5. The method for adjusting a galvano scanner system according to claim 2, comprising:
    concyclically arranging the one-dimensional position sensors at equal angle intervals about the center of the two-dimensional position sensors; and
    detecting the concyclic position of the light spot in the radial direction by each of the one-dimensional position sensors.

6. The method for adjusting a galvano scanner system according to claim 3, comprising:
    concyclically arranging the one-dimensional position sensors at equal angle intervals about the center of the two-dimensional position sensors; and
    detecting the concyclic position of the light spot in the radial direction by each of the one-dimensional position sensors.

7. The method for adjusting a galvano scanner system according to claim 4, comprising:
    concyclically arranging the one-dimensional position sensors at equal angle intervals about the center of the two-dimensional position sensors; and
    detecting the concyclic position of the light spot in the radial direction by each of the one-dimensional position sensors.

* * * * *